March 4, 1952 C. C. DE PEW 2,587,823
FRICTION TYPE CLUTCH
Filed July 16, 1946 2 SHEETS—SHEET 1
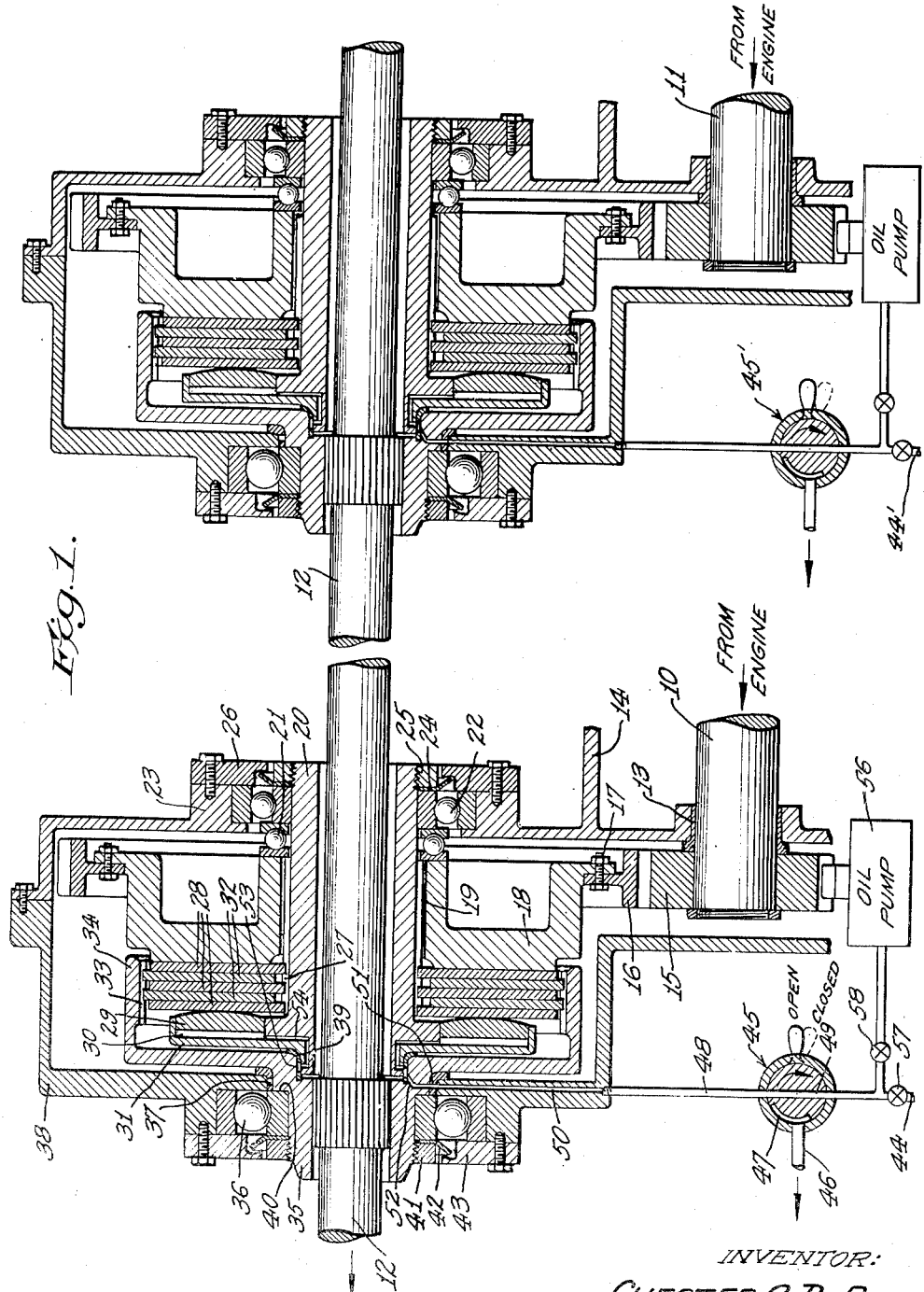
INVENTOR:
CHESTER C. DE PEW
BY
Campbell, Brumbaugh & Free
ATTORNEYS

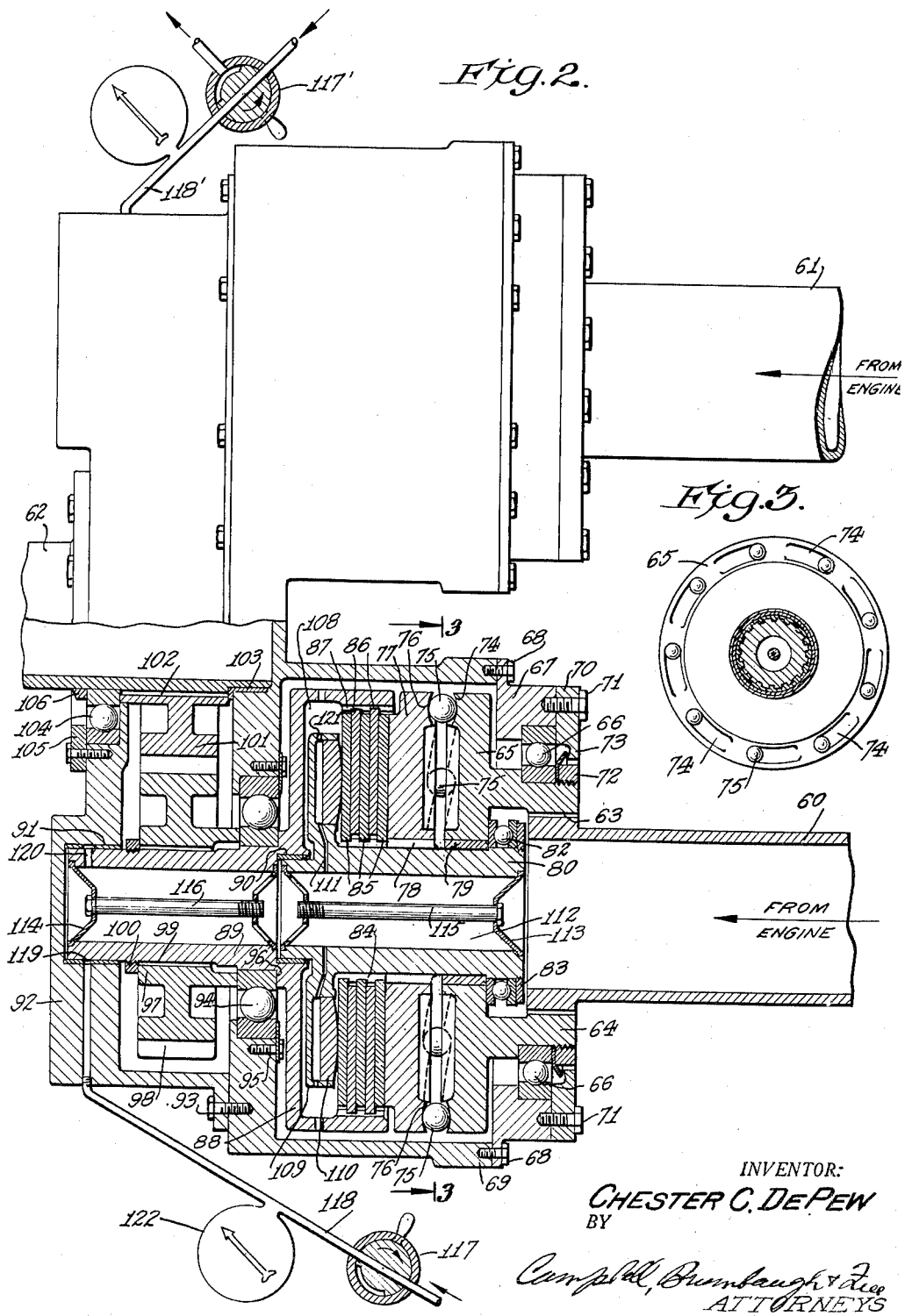

Patented Mar. 4, 1952

2,587,823

UNITED STATES PATENT OFFICE 2,587,823

FRICTION TYPE CLUTCH

Chester C. De Pew, Farmingdale, N. Y., assignor to Fairchild Engine and Airplane Corporation, Farmingdale, N. Y., a corporation of Maryland Application July 16, 1946, Serial No. 684,013

2 Claims. (Cl. 192—47)

This invention relates to multiple engines and has particular reference to two or more separate engines or two or more banks or groups of cylinders driving separate crankshafts, flexibly coupled together so as to jointly or severally drive a common output shaft, such as an aircraft propeller shaft, although the invention is not limited to that use.

Multiple power plants of the general class described are especially useful in the aeronautical field because of their flexibility of operation, since best efficiency is obtained when the full power output of the plant is driving the propeller under certain conditions, whereas under other conditions best efficiency is obtained when one or more of the engine or power units is uncoupled during flight. However, means must be provided for instant uncoupling of an engine in case of its failure. In order to reduce sources of failure a minimum amount of gearing should be employed. Means should also be provided for determining whether the power outputs of the several power plants are equal and in the ratio required by the operator. Various prior arrangements have been proposed in which one or more of the aforementioned requirements are met but none in which all of the requirements are found in a compact, light, and rugged unit providing the required sensitivity and flexibility of operation.

In accordance with the present invention, a multiple engine is provided which affords the aforementioned operating requirements in a compact, light, rugged, but nevertheless sensitive form, in which a clutch is interposed between the power output shaft and the connecting gear driven by the corresponding power input shaft, each clutch being engaged at will or automatically, and disengaged at will or automatically, in response to reduced torque or speed of the corresponding power input shaft.

In one form of the invention, two or more power input shafts are either arranged side by side in parallel relation or in endwise aligned relation with automatic coupling mechanism connected to the power input shaft and, upon initial engagement of the clutch, responsive to the torque transmitted by the corresponding power input shaft fully engaging the clutch, and equally responsive to a torque or speed input decrease for automatically disengaging the power input shaft.

In another form of the invention, the automatic torque responsive coupling mechanism is omitted and a fully manual clutch control substituted, although automatic clutch control may be obtained by rendering the clutch responsive to fluid pressure dependent upon the operation of the corresponding engine, such as the pressure of an oil pump driven thereby.

For a more complete understanding of the invention, reference may be had to the accompanying drawings, in which:

Figure 1 illustrates an axial section through a multiple power plant according to this invention, in which the engines are arranged in tandem relation by way of example;

Fig. 2 illustrates a partial axial section through an automatic torque-operated form of multiple power plant unit of this invention, in which the engines are arranged in side-to-side relation; and, Fig. 3 is a face view of one of the torque-operated cams for actuating the automatic coupling mechanism, as seen along the line 3—3 of Fig. 2.

Referring to Fig. 1 of the drawings, numerals 10 and 11 designate two power input shafts arranged in tandem relation and constituting, for example, the ends of the crankshafts of two internal combustion engines individually mounted. Numeral 12 designates the long power output shaft which extends along or through the engines, and may be the shaft of an aeronautical propeller, or the like. The coupling between each power input shaft 10 and 11 and the power output shaft 12 is the same so that a description of one of them will suffice.

The end of the power input shaft 10 is journalled in a bearing 13 in the stationary frame 14 and carries a spur pinion 15 meshing with a spur gear 16 bolted at 17 to an annular recessed back plate 18. Plate 18 is splined at 19 on sleeve 20, which abuts ball thrust bearing 21, which in turn abuts the inner race of ball bearing 22 on which that end of sleeve 20 is journalled in one-half 23 of the housing integral with frame 14. The inner race of this bearing 22 also holds oil slinger ring 24 in place against spanner nut 25 threaded on the end of sleeve 20, as shown. Oil slinger ring 24 cooperates with a corresponding annular slot in cap plate 26 to prevent bleeding out of lubricant along sleeve 20.

The outer surface of sleeve 20 is provided with axial splines 27 on which spaced friction clutch discs 28 are non-rotatably slidable in an axial direction. The right-hand clutch disc 28 abuts back plate 18 and the left-hand clutch disc 28 is engaged by an annular piston 29 axially slidable in an annular cylinder 30 formed in a flange 31 on the left-hand end of sleeve 20. The outer face of piston 29 is preferably curved so as to have a self-aligning line contact with the engaging clutch disc 28.

The clutch friction discs 32 that are interleaved with discs 28 are non-rotatably splined for axial movement on splines 33 formed on the inner surface of bell 34 whose hub 35 is splined on shaft 12 and journalled on bearings 36 and 37 in the other half 38 of the housing, and on bearing 39 on the flange 31 of sleeve 20. The inner race of ball bearing 36 is clamped between a shoulder 40 on hub 35 of bell 34 and a spanner nut 41 threaded on hub 35. An intervening slinger ring 42 cooperates with an annular recess in cap plate 43 to prevent bleeding out of lubricant along hub 35.

The annular cylinder 30 is filled with oil under pressure supplied from a source of constant oil pressure, not shown, to supply pipe 44, two-way hand valve 45 and feed pipe 48. Valve 45 has an oil discharge pipe 46 connectible through valve discharge passage 47 with feed pipe 48. In the open position of valve 45, passage 49 connects supply pipe 44 with feed pipe 48, as shown. Oil feed pipe 48 leads to cylinder 30 through passage 50 in housing 38 to annular groove 51 in bearing 40, connected by passage 52 in hub 35 with annular groove 53 in bearing 39, which in turn leads by passage 54 in flange 31 to annular clutch cylinder 30.

The other drive unit, connecting power input shaft 11 to output shaft 12 and shown at the right of Fig. 1 is identical to that just described. More than two engines may drive output shaft 12, arranged in tandem as shown in Fig. 1, or two or more engines may be arranged in side-by-side relation, as shown in Fig. 2, or the like.

In operation of the multiple driving arrangement of Fig. 1, either shaft 10 or shaft 11, or both, may be connected and disconnected at will to and from shaft 12 by the operator. Assuming that it is desired to connect input shaft 10 to output shaft 12, the operator throws valve 45 to the open position shown, supplying oil under pressure to cylinder 31 to urge piston 29 to the right, thus forcing clutch discs 28 and 32 together as they are backed by plate 18. Clutch discs 28 and 32 thus frictionally couple plate 18, driven from shaft 10 by gearing 15 and 16, to bell 34 whose hub 35 is splined to power output shaft 12. The drive thus takes place from shaft 10 through gears 15 aand 16, plate 18, spline 19, sleeve 20, clutch disc 28 splined at 27 to sleeve 20, clutch discs 32 splined at 33 to bell 34, and bell 34 to power output shaft 12.

The power input shaft 11 may be similarly connected to power output shaft 12, either before or after the corresponding engine has been started, by opening valve 45' to couple shaft 12 to shaft 11 in the manner described. The initial drive of power output shaft 12 by input shaft 10 may be used to start the engine having shaft 11, simply by engaging the corresponding clutch by opening valve 45'. This couples crankshaft 11 to rotating shaft 12, so that when the ignition is closed, the engine connected to shaft 11 is started by the engine connected to shaft 10.

It will be seen that the drive from each input shaft 10 and 11 is direct and involves only one pair of gears for purposes of speed reduction, so that failure of the gearing for any reason will not interrupt the drive from another input shaft, such as 11. Also, the location of the clutch between the gearing 15, 16 and the output shaft 12 has the advantage of direct coupling.

If it is desired to disconnect the engine of shaft 10 from shaft 12, valve 45 is rotated in the direction of the arrow, so that pressure oil supply pipe 44 is disconnected from feed pipe 48 and the latter is connected through valve passage 47 to discharge pipe 46. Clutch piston 30 is accordingly released to disengage the clutch discs 28 and 32 and uncouple driving plate 18 from bell 34 and output shaft 12. Similarly, the engine of shaft 11 may be disconnected from output shaft 12 independently of input shaft 10 by manipulating valve 45 to disengage the corresponding clutch.

Automatic operation of the mechanism shown in Fig. 1 may be effected by controlling the clutches in accordance with the engine operation. Thus, instead of being of constant pressure, the source of pressure oil connected to pipe 44 may be an oil pump 56 driven directly by the engine driven shaft 10, as by being geared to pinion 15. By disconnecting the constant pressure source by closing valve 57 and opening valve 58 and with valve 45 open as shown, when the oil supply reaches a predetermined pressure determined by the speed of the engine, for example, clutch piston 30 is urged to the right and engages the clutch. Conversely, when the oil pump pressure drops, due to failure or other cause of slowing down of the corresponding engine, the clutch is disengaged and the engine uncoupled to preclude loss of power by being driven by an operating engine. An independent source of oil pressure, or a hand pump should be supplied in this case to enable engagement of the coupling clutches when the corresponding engine is not operating, such independent source being placed into or out of clutch-operating condition at will and not interfering with the normal automatic operation.

In the form of the invention shown in Fig. 2, the coupling of the individual power input shafts to the power output shaft is initiated automatically by a torque responsive coupling mechanism. When it is desired to start one engine from the other or to prevent the propeller from over-revving as during a glide, fluid is permitted to enter cylinder 109 under pressure, thereby forcing clutch plates 85 and 86 into engagement and causing plate 77 to exert pressure upon balls 75 at the bottom of cam ramps 74 so that torque is transmitted through the abutments at the ends of the cam ramps from plate 77 to cam disc 65 whereby the driving and driven members are connected and the normal power input shaft is caused to rotate by the normal power output shaft. Referring to Fig. 2, where the power input shafts 60 and 61 are shown in side-by-side relation with the output shaft 62 between them, the end of the power input shaft 60 is provided with a coupling spline 63, whereby it is removably coupled to the hub 64 of a cam disc 65 journalled on bearing 66 mounted in a recessed cover plate 67 secured by bolts 68 to stationary housing 69. The outer race of bearing 66 is held in place by cap plate 70 secured by bolts 71 to cover plate 67, and the inner race of bearing 66 is secured on hub 64 by spanner nut 72. A slinger ring 73 clamped between bearing 16 and nut 72 and cooperating with a recess in plate 70 precludes bleeding of lubricant over hub 64.

Cam plate 65, shown in greater detail in Fig. 3, comprises a circular disc having successive cam ramps 74 arranged circularly on its inner face and all inclined at the same angle to a plane normal to the axis and in the same direction. Cam ramps 74 on disc 65 are adapted to cooperate with balls 75, which in turn cooperate with cam ramps 76 formed in plate 77 and conforming to cam ramps 74 but inclined in the opposite direction, as shown. Cam plate 77 is non-rotatably splined on hollow shaft 80 by splines 78 for axial movement therealong. The right-hand end of hollow shaft 80 is journalled in bearing 79 in cam plate 65, as shown. A thrust bearing 82 is interposed between the cam disc 65 and a nut 83 on the end of shaft 80. Thus, inasmuch as cam plate 65 is axially fixed, relative rotation between it and plate 77 in the direction of inclination of ramps 74, causes cam plate 77 to be moved along spline 78 to the left as seen in Fig. 2.

Shaft 80 is provided with axial splines 84, on which preferably are extensions of splines 78 and on which spaced clutch discs 85 are non-rotatably slidable in an axial direction. Interposed between clutch discs 85 are clutch discs 86 which are axially slidable but non-rotatable on splines 87 formed on the inner surface of a bell flange 88 secured to or formed integrally with hollow shaft 89 journalled at one end on bearing 90 mounted on the corresponding end of aligned shaft 80. The other end of hollow shaft 89 is journalled in bearing 91 seated within a recess of cover plate 92 secured by bolts 93 to housing 69.

Shaft 89 is also journalled in housing 69 by ball bearing 94, whose outer race is secured to housing 69 by a ring and bolt combination 95 and whose inner race is clamped between shoulder 96 on bell flange 88 and the hub of gear 98 splined at 99 to shaft 89 and held in place thereon by spanner nut 100. Gear 98 meshes with gear 101 splined at 102 on power output shaft 62 which is journalled at one end in bearing 103 secured in a recess in housing 69 and at the other end on ball bearing 104, whose outer race is secured in cover plate 92 by ring 105 and its inner race on power output shaft 62 by spanner nut 106.

Positioned within the chamber 108 between bell flange 88 and outer clutch disc 85 is an annular cylinder 109 formed integrally with shaft 80 and containing an axially slidable piston 110 whose outer face preferably is curved in cross-section as shown and which abuts the outer clutch disc 85. Annular cylinder 109 is normally filled with oil under pressure supplied thereto by radial passages 111 leading from the cavity 112 formed jointly by hollow shafts 80 and 89 and plugs 113 and 114 held in place by bolts 115 and 116. Oil under pressure from an oil pump, not shown, is supplied through hand valve 117 to the cavity 112 by pipe 118, annulus 119 in stationary bearing 91, and radial passage 120 leading from annulus 119 to the cavity 112. Bleed holes 121 leading from cylinder 109 prevent balls 75 from being forced to the lower ends of the cam ramps 74 and 76 during especially rigorous operating conditions, and also regulate the balance between piston 110 pressure and ball 75 pressure.

Inasmuch as the pressure on clutch discs 85 and 86 must be such as to maintain them in frictional driving engagement, it is directly proportional to the torque transmitted by input shaft 60 to output shaft 62, so that pressure on the oil in cylinder 109 when the clutch is engaged may be directly indicated by oil pressure. Accordingly a pressure-responsive torque indicator 122, such as of the Bourdon type, with its dial graduated in units of torque, is connected to oil feed line 118, as shown in Fig. 2.

The other drive unit, adapted to connect power input shaft 61 to power output shaft 62 is identical to that just described and is controlled by a hand valve 117'. A torque indicator 122' indicates the torque transmitted from shaft 61 and may be juxtaposed on dial 122.

In operation of the mechanism illustrated in Figs. 2 and 3, and assuming that input shaft 60 is to be connected to power output shaft 62, the operator throws valve 117 to the open position shown so as to connect pressure oil to cylinder 109. Piston 110 is accordingly forced to the right to the degree permitted by bleed holes 121 which are uncovered when the piston 110 reaches the predetermined position causing clutch discs 85 and 86 to engage sufficiently to hold cam plate 77 relatively fixed. Inasmuch as cam plate 65 is being driven by input shaft 60 in a clockwise direction relatively to cam plate 77, which is holding the balls 75 relatively stationary, the inclination of the ramps 74 and 76 causes the balls 75 to move plate 77 to the left, as seen in Fig. 2. Plate 77 thus firmly urges clutch plates 85 and 86 into coupling engagement, whereby shafts 80 and 89 are coupled together.

The drive from power input shaft 60 takes place through spline 63, cam plate 65, balls 75, plate 77, spline 78, clutch discs 85, clutch discs 86, spline 87, bell flange 88, shaft 89, gears 98 and 101 and spline 102 to power output shaft 62. The same operation occurs between power input shaft 61 and power output shaft 62.

However, if power output shaft 62 is driven by power input shaft 61 under such conditions that power output shaft 62 tends to drive power input shaft 60, the balls 75 descend cam ramps 74 and 76, thus relieving the pressure on clutch plates 85 and 86 so that the latter automatically disengage if the pressure oil supply to the corresponding clutch is cut off. It is thus evident that unless both power input shafts 60 and 61 are driving power output shaft 62 with equal speed, the one whose speed is the least will tend to become disengaged from the power output shaft 62 in the manner described.

When the speed of one declutched crankshaft equals that of the other, the corresponding clutch plates are automatically reengaged and that crankshaft coupled to power output shaft 62. Thus, by throttle and oil valve manipulation of one engine, it may be uncoupled and recoupled at will from and to the power output shaft, and may operate at idling speed when not required to drive, or may be entirely stopped and then restarted in flight. Torque is indicated by oil pressure with the calibrated gauges 122 and 122' for the respective input shafts 60 and 61, after bleed vents are closed by piston 110, when torque is directly proportional to oil pressure.

It will be seen that the automatic clutching and declutching action of the form shown in Figs. 2 and 3 is very sensitive to torque variations and also enables starting of the clutch engaging operation at will, by selective manipulation of valves 117 and 117'. By connecting an oil pump, driven by the corresponding shaft 60 or 61 to the pressure supply pipes 118 and 118' the coupling may be initiated automatically instead of manually, as was described in connection with Fig. 1. Thus, when the speed of crankshaft 60 reaches the point where a predetermined oil pump pressure is built up, piston 110 is advanced to the starting position where the servo ball 75 and cam 74—72 combination assumes clutching control, as described. However, for the arrangement shown in Figs. 2 and 3, a positive and constant source of fluid pressure is preferred.

Although certain preferred embodiments of the invention have been illustrated and described herein, it is to be understood that the invention is not limited thereby, or to coupling engine crankshafts, but is susceptible to other uses and to changes in form and detail within the scope of the appended claims.

I claim:

1. A mechanism for driving a power output shaft from a power input shaft, comprising a first rotatably mounted plate driven by said power input shaft, a bell coaxial with said first plate and connected to said output shaft for driving the latter, an idler shaft interposed between and coaxial with said plate and bell and rotatable relative to them, a clutch having opposed groups of friction clutch discs, means connecting one group of discs to said bell for rotation therewith and axial movement relative to said bell, means connecting another group of said discs to said idler shaft for rotation therewith and axial movement relative thereto, a second plate rotatable with said idler shaft and movable axially thereof, said second plate being interposed between said clutch and said first plate, camming means on opposed faces of said first and second plate to move said second plate axially upon relative rotation of said plates and to couple said plates for rotation together after a predetermined relative rotation, an annular cylinder concentric with and mounted within said bell for rotation therewith, an annular piston in said cylinder adjacent to and engageable with one of the clutch discs, and means for introducing fluid under pressure into said cylinder to urge said piston against said one of said clutch discs to force said discs together and against said second plate to rotate the latter relative to said first plate, said camming means then becoming effective to couple said first plate to said second plate.

2. A mechanism for driving a power output shaft from a power input shaft, comprising a first rotatably mounted plate driven by said input shaft, a bell coaxial with said first plate and connected to said output shaft for driving the latter, opposed friction clutch discs, means connecting at least one of said discs to said bell for rotation therewith, a second plate adjacent to said first plate and between said first plate and said clutch discs and coaxial therewith, means connecting another of said discs to said second plate for rotation therewith, camming means on opposed faces of said first and second plates to move said second plate axially upon relative rotation of said first and second plates and to couple said plates for rotation together after a predetermined relative rotation, an annular cylinder concentric with and mounted within said bell for rotation therewith, an annular piston in said cylinder adjacent to and engageable with one of the clutch discs, and means for introducing fluid under pressure into said cylinder to urge said piston against said one of said clutch discs to force said discs together and against said second plate to rotate the latter relative to said first plate, said camming means then becoming effective to couple said first plate to said second plate.

CHESTER C. DE PEW.

REFERENCES CITED

The following references are of record in the file of this patent:

UNITED STATES PATENTS

| Number | Name | Date |
| --- | --- | --- |
| 2,014,630 | O'Brien | Sept. 17, 1935 |
| 2,020,667 | Wahl | Nov. 12, 1935 |
| 2,091,270 | Colman | Aug. 31, 1937 |
| 2,239,236 | Lambert | Apr. 22, 1941 |
| 2,314,030 | Bloomfield | Mar. 16, 1943 |
| 2,408,301 | Eason | Sept. 24, 1946 |
| 2,448,763 | Bloomfield | Sept. 7, 1948 |